Figure 1:
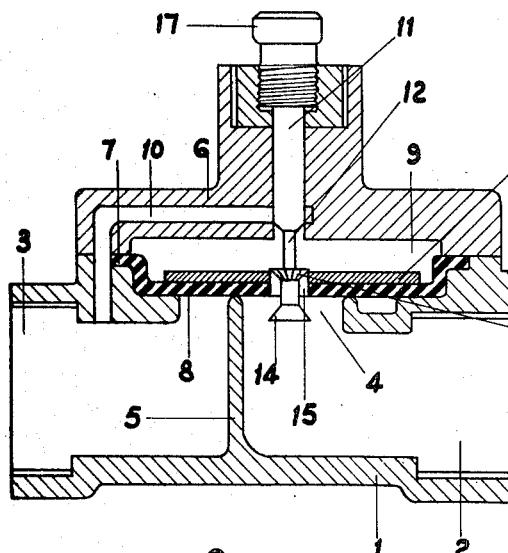

United States Patent
Dawson

[11] 3,712,578
[45] Jan. 23, 1973

[54] CONTROLS FOR VALVES
[76] Inventor: Peter Leonard Dawson, 8 Contour Road, Krugersdorp, South Africa
[22] Filed: Aug. 24, 1970
[21] Appl. No.: 66,492

[30] Foreign Application Priority Data
Aug. 26, 1969 South Africa..........................69/6192

[52] U.S. Cl. ......................251/35, 251/42, 251/46
[51] Int. Cl..............................................F16k 31/385
[58] Field of Search............................251/35, 46, 42

[56] References Cited
UNITED STATES PATENTS

| | | | |
|---|---|---|---|
| 3,074,684 | 1/1963 | Doyle | 251/46 X |
| 882,944 | 3/1908 | Haas | 251/46 X |
| 1,851,062 | 3/1932 | Protzer | 251/46 |
| 2,917,268 | 12/1959 | Soderberg et al. | 251/35 |
| 1,146,012 | 7/1915 | Mason | 251/42 X |

Primary Examiner—Arnold Rosenthal
Attorney—Shoemaker & Mattare

[57] ABSTRACT

The invention relates to valves wherein the passageway therethrough is closed by a diaphragm and fluid pressure in the line in which the valve is located is used to close the valve. The valve is controlled by an auxiliary valve in a by-pass passage enabling the escape of fluid under pressure acting on the diaphragm to close the valve and a shaped member located in an aperture through the diaphragm such that there is co-ordination between the flow through the aperture and movement of the auxiliary valve.

6 Claims, 5 Drawing Figures

PATENTED JAN 23 1973 3,712,578

INVENTOR
PETER L. DAWSON
By Shoemaker and Mattare
ATTORNEYS

CONTROLS FOR VALVES

This invention relates to valves and more particularly to valves having a diaphragm closure member.

Valves of the type referred to, and particularly those which utilize fluid pressure in the pipe line in which they are included to effect closure of the valve, do not usually lend themselves to anything but fully open or fully closed conditions. They also generally have a tendency to induce water hammer or other shock closures in systems in which they are included.

It the object of the present invention to provide a valve of this type which will include means whereby control of the operation of the valve is easily effected.

According to this invention there is provided a valve comprising a body with a passageway therethrough, a wall in the passageway between the inlet and outlet and adapted to seat on said wall a flexible diaphragm which is secured around its periphery in the body, a chamber behind the diaphragm on the opposite side thereof to the wall, a by-pass passage from the chamber, a movable auxiliary valve located to control flow through the by-pass passage, an aperture through the diaphragm and a flow control means in said aperture and movable relative thereto in co-ordination with movement of the auxiliary valve to control flow through the aperture.

The invention also provides for the flow control means to be in line and integral with the auxiliary valve, to be of tapered shape or to carry shaped members thereon.

Further features of this invention provide for the diaphragm to be made of resilient material supported on the chamber side thereof by rigid material, and for the shaped members to be on opposite sides of the diaphragm and spaced apart more than the thickness of the latter.

Still further features of the invention provide for the flow control means to co-operate with a tubular form around the aperture through the diaphragm to form a sliding flow throttling assembly.

Preferred forms of this invention will be described with reference to the accompanying drawings which show sections through different valve constructions.

Figure 3:
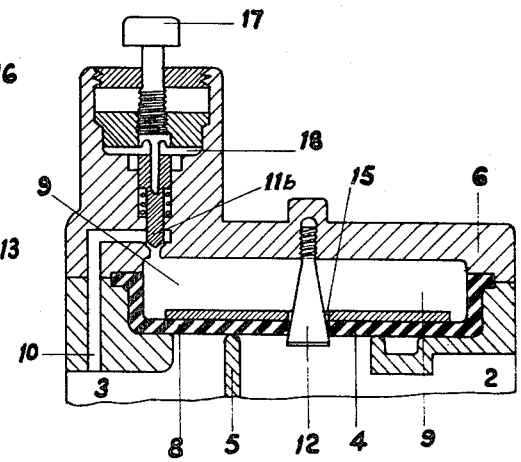
Figure 2:
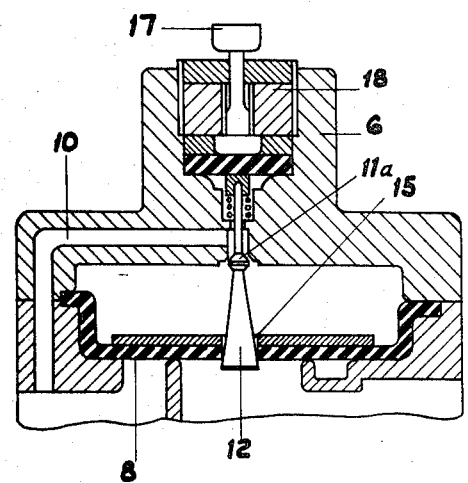
Figure 4:
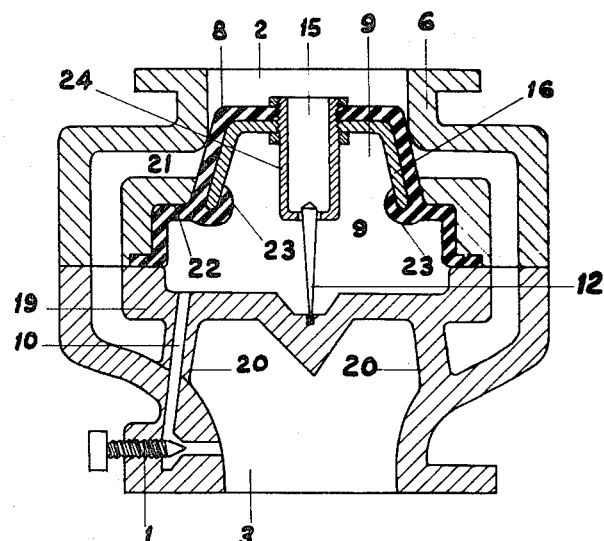
Figure 5:
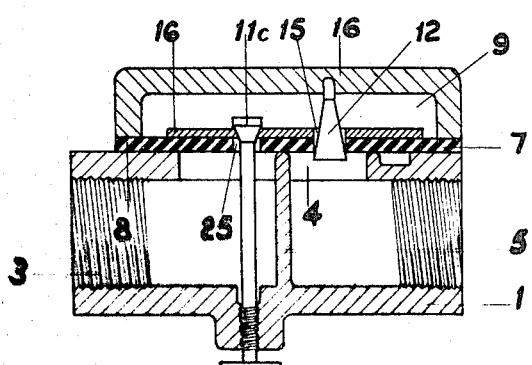

FIG. 1 is a sectional elevation of a valve having in line inlet and outlet openings, FIG. 2 is a similar view to FIG. 1 with the outlet co-axially arranged around the inlet, FIG. 3 is a view similar to FIG. 2 but showing the tapered flow control member separate from the auxiliary valve, FIG. 4 shows an embodiment with the pressure chamber within the body of the valve, and FIG. 5 shows a valve with the tapered flow control member separate from the auxiliary valve and with in line inlet and outlet openings.

As shown in FIG. 1 the valve is suitable for the control of fluid flow through a pipe line and consists of a body 1 with an inlet 2 at one end and an outlet 3 at the other.

An aperture 4 is made through the wall of the body and this aperture is positioned over the free end of a wall 5 which extends across the passageway between the inlet and outlet of the valve. Flow through the valve must thus take place over the wall 5. It will be appreciated that the wall could be formed by the annular end of a pipe introduced into the body 1 to form the inlet into the valve.

The body is shaped so that a closure cap 6 can be secured over the aperture and retain the peripheral edge 7 of a flexible rubber or rubber-like diaphragm 8 in position for the diaphragm 8 to act as a closure member seating on the wall 5 to separate the inlet 2 from the outlet 3 and prevent flow through the valve.

The cap 6 ensures that there is a chamber 9 above the diaphragm 8 with a by-pass passage 10 from the chamber 9 to the outlet end 3 of the valve body 1.

The by-pass passage 10 is controlled by an auxiliary manually controlled valve 11 which is mounted centrally in the closure cap 6. This valve 11 projects inwardly to control the opening of by-pass passage 10 into the chamber 9 and carries a flow control means or stem 12 projecting from the inner end of the valve. The end of the stem carries a pair of members 13 and 14 thereon spaced apart along the length of the stem a distance slightly larger than the thickness of the diaphragm. These members 13 and 14 are positioned to hold the diaphragm 8 between them with part of the stem 12 passing freely through a central hole 15 through the diaphragm 8. The diaphragm 8 is supported by a rigid plate 16 as shown. The member 13 is an interference sliding fit on stem 12 the reasons for which are set out below.

The members on the end of the stem 12 are shaped to ensure that there is a passage 15 past the stem 12 into the chamber 9 which passage 15 is of smaller effective area than that of the by-pass passage 10. the passage 15 is closed when the member 14 is in contact with the diaphragm 8 as set out below.

In use it will be appreciated that control of the auxiliary valve 11 through thumbscrew 17 will allow flow to and from the chamber 9 thus allowing the fluid pressure in the pipe line to move the diaphragm 8 onto or off its seat. The central part of the diaphragm 8 is constrained to move with the members 13 and 14 on the stem 12 and thus the degree of opening of the valve can be finely controlled.

When the valve 11 is made to close the bypass passage 10 the member 13 tends to hold the diaphragm 8 onto its seat but allows fluid flow from the inlet 2 through the central hole 15 past the member 13 into the chamber 9 where the fluid pressure in the pipe line acts on the diaphragm to hold the valve positively closed.

Should there at any time be a sudden pressure surge in the inlet 2 this surge will act on the diaphragm 8. The interference fit of member 13 is made to allow the member to be forced up stem 12 by the diaphragm and escape through the valve. When the auxiliary valve is next fully opened the member 13 will be forced back into its normal operating position.

As the by-pass passage 10 is opened by manipulation of auxiliary valve 11 the fluid in chamber 9 can escape and when its rate of escape is faster than flow past pintle 12 the diaphragm 8 will lift off its seat to enable fluid flow through the valve from inlet 2 to outlet 3. When member 14 contacts the diaphragm no fluid can enter the chamber 9 and at the same time the by-pass is opened. At all times that the valve 11 is fully open the diaphragm is held in contact with member 14 and there will then be full flow through the valve between inlet 2 and outlet 3. The movement of the auxiliary valve 11 and distance between member 13 and 14 as well as the sizes of the various openings through the valve are designed to ensure the control of quantity of fluid flow at all times.

It will be appreciated that even with the auxiliary valve 11 in intermediate positions to give different degrees of opening of the valve this control can be achieved.

In the description with reference to the remaining Figs. of this specification similar parts are given identical numerals to those in the above description.

In the embodiment shown in FIG. 2 the flow control means or stem 12 has a tapered form and extends through the diaphragm 8 with the larger and free end outside the chamber. Preferably the flow control means will be tapered to have an included angle of between 3° and 12° but may have different shapes to impart different opening and closing characteristics to the valve. The auxiliary valve 11a is arranged to close the by-pass 10 while simultaneously drawing the flow control means 12 into the chamber to restrict the aperture 15 through the diaphragm 8.

As this valve 11a is opened the outlet through by-pass 10 from chamber 9 becomes greater than the inlet area through the diaphragm. This causes a pressure drop in chamber 9 and the diaphragm 8 can be forced along the flow control means 12 by the fluid pressure in the inlet giving an increased passage into the chamber 9 and it will be understood that the balance between the opening of by-pass passage 10 and aperture 15 into the chamber 9 will determine the extent to which the diaphragm 8 will move off its seat and thus the degree of opening of the valve. This arrangement can be made to give very fine control of valve opening.

The sealing arrangements indicated generally at 18 show how the manipulating mechanism can be sealed from the fluid controlled by the valve. This is advantageous when dangerous or corrosive fluids need to be controlled and no seals around moving stems are required.

The embodiment shown in FIG. 3 is similar to that of FIG. 2 but the auxiliary valve 11b is separated from the flow control means or stem 12. In this form the auxiliary valve 11b operates in the by-pass passage 10 in the side of the chamber 9 and the flow control means 12 is again of tapered shape. In this case however the flow control means is fixed to the wall 6 of the chamber 9 and the closure of the aperture through the diaphragm 8 is controlled by pressure in the chamber alone.

Springs may be included to act on the diaphragm 8 to give additional assistance to the inherent resilient flexibility of the diaphragm 8 to cause closure of the valve.

In yet another example of this invention as shown in FIG. 4 the control can be applied to large diameter valve.

In this arrangement the chamber 9 is formed with a ring member 19 carried in the passage through the valve between inlet 2 and outlet 3 by webs 20.

The diaphragm 8 is of part conical shape and adapted to seal off the inlet 2 from the radial opening 21 through the valve. Particularly where high pressure are encountered it is most desirable that the ring member 19 be shaped as shown at 22 to support the flexing portion of the diaphragm 8 while that part of the latter at the edge of the supporting plate 16 be built up as shown at 23. This enables the rubber to accommodate the stresses set up between inlet and outlet of the valve when the valve starts its opening movement.

In the construction shown the flow control means or stem 12 is a flexible element supported in the ring member 19 and the aperture 15 through the diaphragm 8 is made in the tubular forms 24 so that flow control means 12 and tubular form 24 form between them a sliding valve assembly.

This assembly controls the flow of fluid through the aperture 15 through diaphragm 8 and from chamber 9 to the outlet 3 through the by-pass 10.

The movement of the diaphragm 8 may be mechanically effected, for example, by means of a flexible shaft, through a control similar to that in FIG. 1 where flow control means 12 is replaced by a flexible shaft to ensure movement of the diaphragm with the flow control means and the shaft extending centrally through the ring 19.

Also the positions of flow control means 12 and tubular form 24 can be reversed provided the sliding valve assembly is obtained.

Another example of this invention is illustrated in FIG. 5 of the drawings. In this case the by-pass passage 10 through the body is eliminated and the auxiliary valve 11c is made to operate directly in a second aperture 25 through the diaphragm 8. The aperture 25 is on the opposite side of the wall 5 to the aperture 15 with its associated flow control means 12.

The valve 11c can be operated either through the cap 6 as shown or through the outlet portion of body 1.

This construction is simple and the stem of valve 11c and flow control means 12 ensures that the apertures 15 and 25 are always kept clear of any blockages. It should be noted that the stem of valve 11c can be attached to various control mechanisms so that the valve will automatically operate in various manners.

In all cases described the invention provides for a controlled opening of a valve having a diaphragm closure member and wherein fluid pressure is used to effect opening or closing of the valve. Springs may be included in the valve construction to assist these operations if desired. Also for high pressures the diaphragm can be thickened over its seating portion and the seat may be tapered. This arrangement is found to operate over lengthy periods and with satisfactory sealing.

What I claim as new and desire to secure by Letters Patent is:

1. A valve having means for limiting the amount of opening movement thereof comprising, a valve body having an inlet and outlet, a passageway extending through said body from said inlet to said outlet, wall means in said body and extending across said passageway, said wall means having an aperture therethrough, a valve seat around said aperture, a flexible diaphragm valve secured at its periphery in said valve body adjacent said valve seat in spanning relationship thereto and movable toward and away from said valve seat to control flow through said aperture, said diaphragm valve with said valve body defining a pressure chamber on the side of said diaphragm valve opposite said valve seat, an outlet passage extending from said pressure chamber to the outlet of said valve to vent said pressure chamber, an auxiliary valve in said outlet passage for controlling flow therethrough, an opening through said diaphragm valve from said inlet to said pressure chamber to admit fluid pressure to said chamber to move said diaphragm valve toward said seat, and tapered flow control means having a large end and a small end and extending from said inlet through said opening in said diaphragm valve toward said pressure chamber with the large end positioned on the inlet side of said diaphragm for controlling flow through said opening, said flow control means including a shaped member located on the opposite side of the diaphragm to the flow control means and spaced apart from that part of the flow control means which is as large as the aperture by a distance greater than the thickness of the diaphragm, the shape of the member ensuring a passage past it through the diaphragm and at the same time limiting opening movement of said diaphragm valve in coordination with movement of said auxiliary valve when said auxiliary valve is opened to vent said pressure chamber.

2. A valve as claimed in claim 1 in which the flow control means is in line and integral with the auxiliary valve.

3. A valve as claimed in claim 1 in which the member in the chamber is a sliding interference fit on the stem.

4. A valve as claimed in claim 1 in which the diaphragm is resilient and supported over the seating area by a rigid plate.

5. A valve having means for limiting the amount of opening movement thereof comprising, a valve body having an inlet and an outlet, a passageway extending through said body from said inlet to said outlet, wall means in said body and extending across said passageway, said wall means having an aperture therethrough, a valve seat around said aperture, a flexible diaphragm valve secured at its periphery in said valve body adjacent said valve seat in spanning relationship thereto and movable toward and away from said valve seat to control flow through said aperture, said diaphragm valve with said valve body defining a pressure chamber on the side of said diaphragm valve opposite said valve seat, an outlet passage extending from said pressure chamber to the outlet of said valve to vent said pressure chamber, an auxiliary valve in said outlet passage for controlling flow therethrough, an opening through said diaphragm valve from said inlet to said pressure chamber to admit fluid pressure to said chamber to move said diaphragm valve toward said seat, and flow control means extending from said pressure chamber through said opening in said diaphragm valve toward said inlet for controlling flow through said opening and at the same time limiting opening movement of said diaphragm valve in coordination with movement of said auxiliary valve when said auxiliary valve is opened to vent said pressure chamber, said flow control means including a pair of combination flow control and stop members arranged on opposite sides of said diaphragm valve and mounted on a stem extending through said aperture, said members being inwardly tapered toward one another and spaced apart from one another a distance greater than the thickness of the diaphragm, one of said members positioned at the side of said diaphragm valve opposite said valve seat and allowing flow of liquid therepast from the inlet through the opening in the diaphragm valve, said members each being engageable by said diaphragm to limit movement of said diaphragm toward and away from said valve seat to predetermined amounts.

6. A valve as in claim 5, wherein said one member is slidable on said stem so that in the event of a sudden surge of pressure in the inlet, said one member moves axially on said stem upon being engaged by said diaphragm valve to relieve stresses induced by said pressure surge.

* * * * *